INVENTORS
SIGMUND EGE
M. DAVID SCHNUR
BY
*U. F. Volk*
THEIR AGENT

INVENTORS
SIGMUND EGE
M. DAVID SCHNUR
BY
O.J. Volk
THEIR AGENT

3,099,932
METHOD AND APPARATUS FOR STRANDING AND BRAIDING

Sigmund Ege, Hastings on Hudson, and Martin David Schnur, New York, N.Y., assignors to Anaconda Wire and Cable Company
Filed Dec. 15, 1961, Ser. No. 159,671
6 Claims. (Cl. 87—1)

Our invention relates to a method and apparatus for simultaneously stranding and braiding, and particularly for such method and apparatus for stranding, braiding and filling a cable.

In our copending application filed on the same day as the present application there is disclosed a leak-proof electric cable having silicon-rubber insulated conductors and sealed throughout with a pasty sealing compound. Two insulated, glass-braided, conductors are twisted together to form a pair which is covered with a copper braid and finally with a glass braid. In order to insure that the braids should be thoroughly leak-proof, the twisted pairs, which include filler material in the valleys, are coated with an extruded layer of pasty filler compound prior to braiding and the braid is applied under high enough tension to cause the individual strands to embed themselves in the compound. Prior to the present invention it has not been possible to extrude filler compound over the twisted pair in a satisfactory manner because the pressure in the extruder head tends to apply back pressure and this is invariable slightly different for each of the two strands which may have been twisted under somewhat different tensions. Even though the difference is very slight, over a long length of cable one of the conductors gradually forms a significant bight or loop behind the extruder die which tends to override the fillers and lay unevenly, and may even jam the die and break. A further difficulty in the manufacture of fluid-tight cable has been the necessity to form the twisted pair without imparting any back twist to the individual insulated conductors. The glass braid is relatively lacking in stretchability and should not be subjected to permanent torsional deformation nor should it be bent sharply in passing over guides and the like. We have invented apparatus for twisting and braiding a fluid-tight cable which overcomes the aforementioned difficulties. An example of our apparatus, chosen to be illustrative but not limiting, comprises a vertical frame, at least one braider head mounted on the frame and means mounted at the top for advancing a plurality of insulated conductors through the braider head. It also comprises a rotating platform mounted on the frame beneath the head and a plurality of bearings mounted on the platform. Shafts are mounted in the bearings supporting brackets which, in turn, support supply reels of filaments such as insulated conductors. Our apparatus also comprises a forming die mounted centrally on the frame beneath the braider head and the shafts and brackets are tilted toward the forming die so that the planetary motion of each reel occurs in a plane normal to a line joining the die to the midpoint of the reel. Drive pulleys tilted at an acute angle to the plane of rotation of the platform are mounted on the shafts and there are stationary pulleys mounted centrally of the frame with belts connecting each of the drive pulleys to one of the stationary pulleys thereby imparting planetary motion to the reels. A plurality of braces extend downwardly from the platform each with a roller mounted on it. The rollers deflect the belts so as to compensate for the tilt of the drive pulleys. A plurality of filler-strand supply coils are mounted on the platform and there is an extrusion head coaxial with the forming die mounted on the frame between the die and the braiding head.

A more thorough understanding of our invention may be obtained by reference to the drawing.

Figure 1:
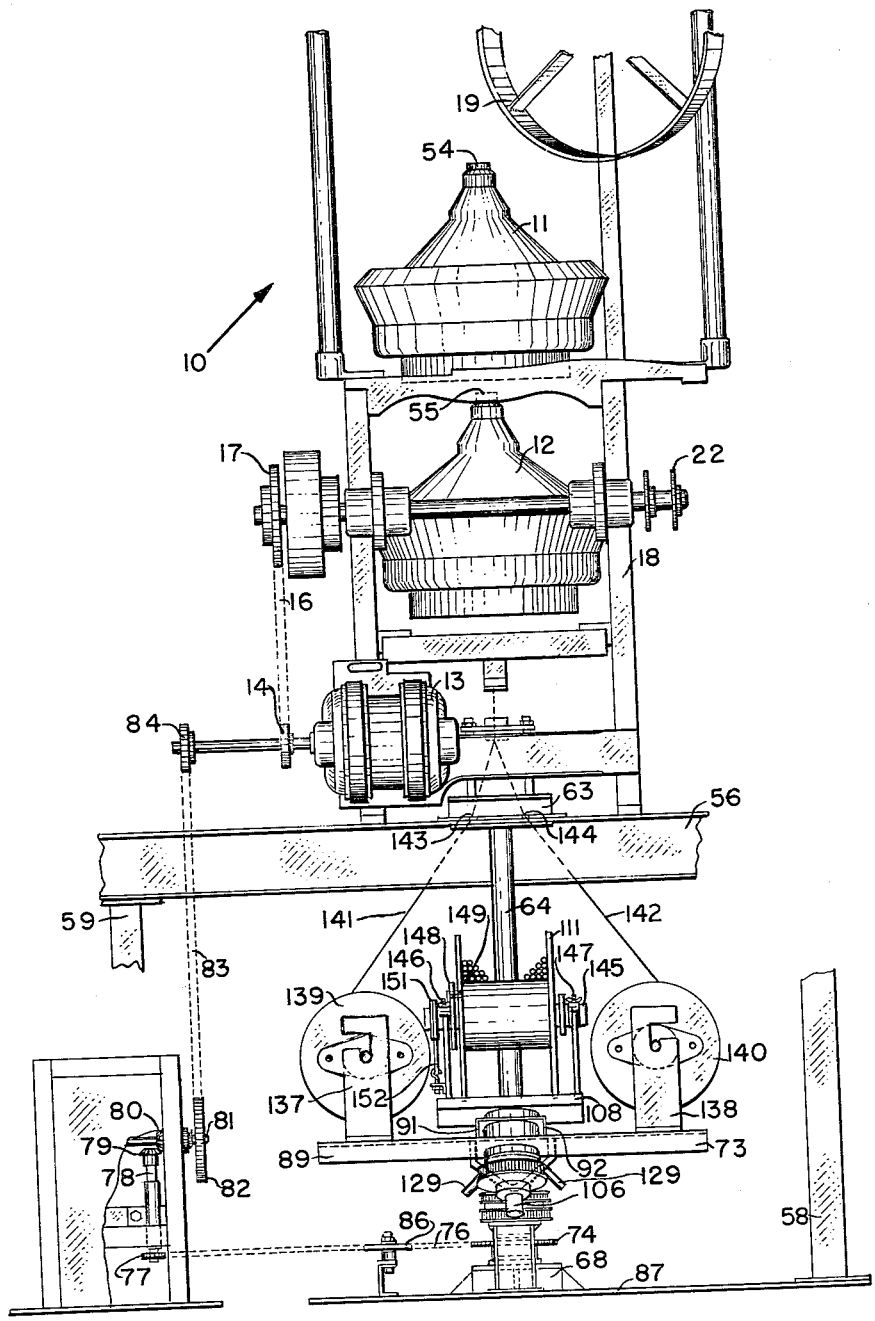
FIGURE 1 is a front elevation of an apparatus of our invention.
Figure 2:
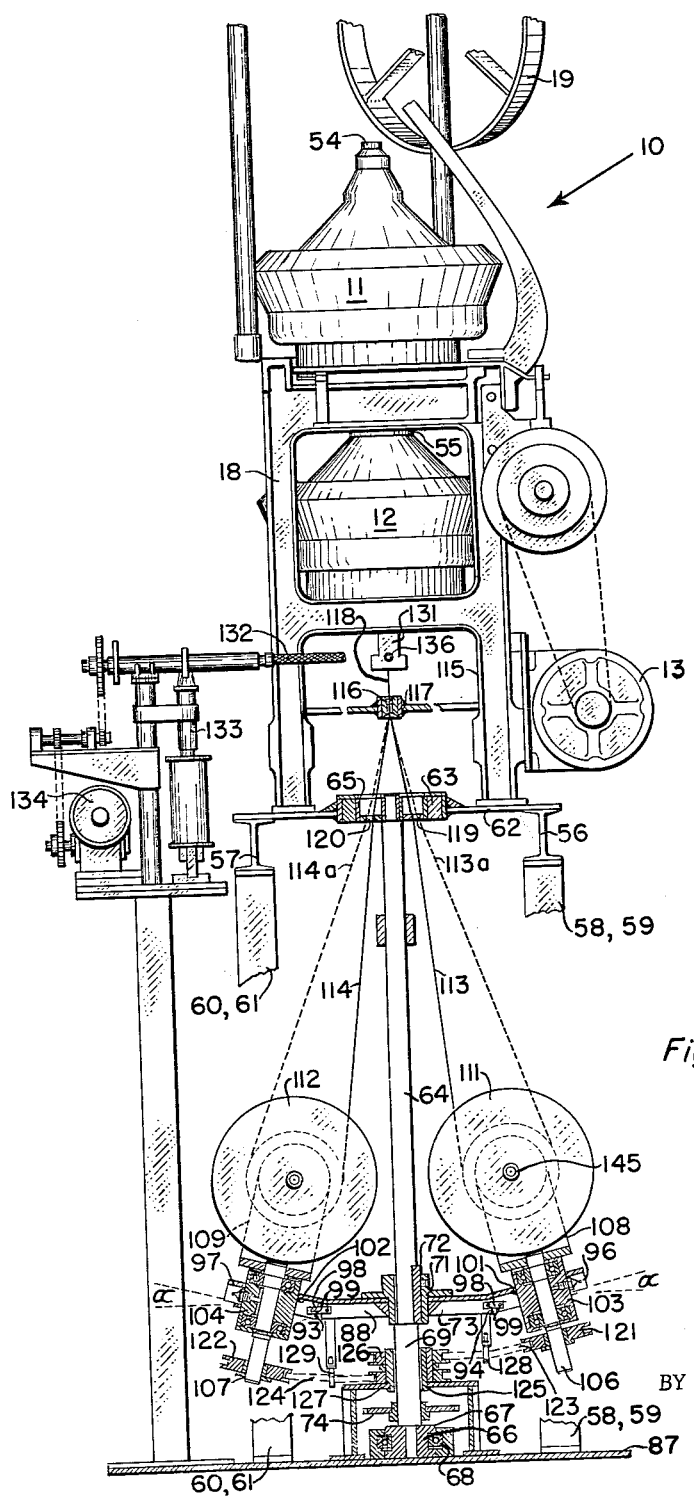
FIGURE 2 is a side elevation, partly in section, of the apparatus of FIGURE 1.
Figure 3:
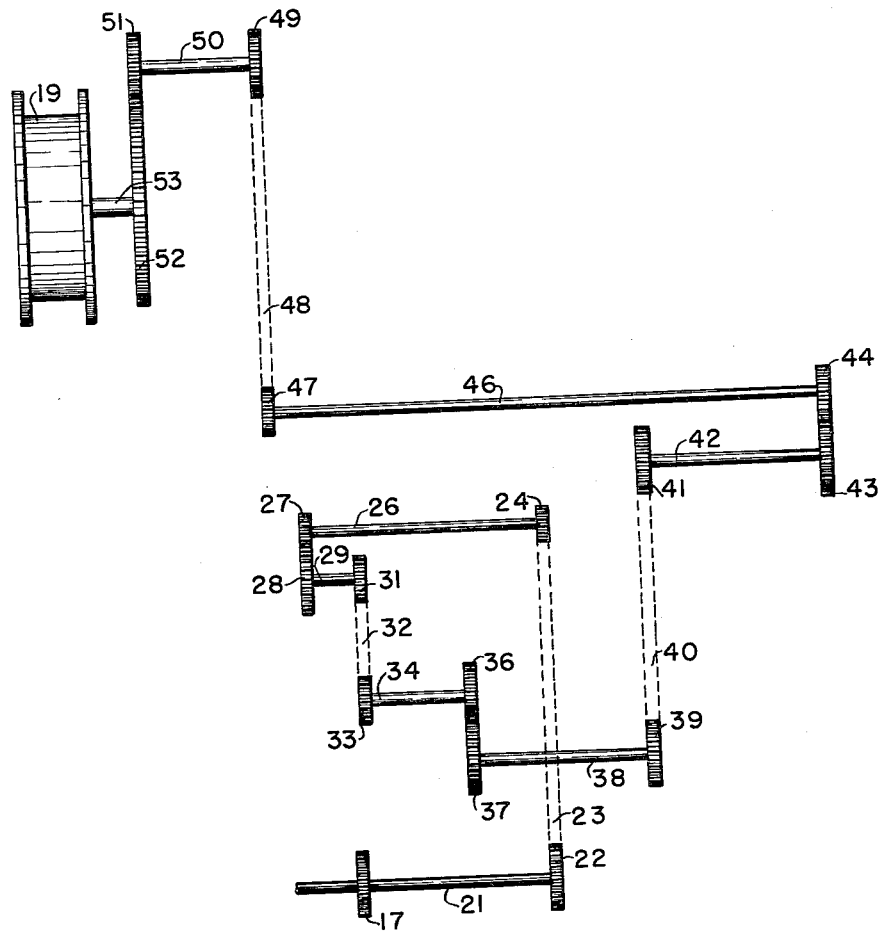
FIGURE 3 is a diagrammatic representation of the gear train of an embodiment of our apparatus.

In the figures combined stranding, filling, extruding, and braiding apparatus indicated generally by the numeral 10 comprises two braiding heads 11, 12 of known type driven by a motor 13 by means of a sprocket 14, chain 16 and sprocket 17. The aforesaid elements are all mounted on a vertical framework 18 on the uppermost part of which is also mounted a capstan 19. The capstan 19 is driven by the motor 13 through the sprocket 14, chain 16 (see FIGURE 3), sprocket 17, shaft 21, sprocket 22, chain 23, sprocket 24, shaft 26, gear 27, gear 28, shaft 29, sprocket 31, chain 32, sprocket 33, shaft 34, gear 36, gear 37, shaft 38, sprocket 39, chain 40, sprocket 41, shaft 42, gear 43, gear 44, shaft 46, sprocket 47, chain 48, sprocket 49, shaft 50, gear 51, gear 52, and capstan shaft 53 to draw strands through centers 54, 55 respectively of the braider heads 11 and 12. The aforementioned gear train diagrammed in FIGURE 3 is omitted from the FIGURES 1 and 2 to avoid cluttering the drawing. The portion of the drawing so far described is standard braiding equipment known as a Wardwell braider made by Wardwell Braiding Machine Co., Central Falls, Rhode Island. The framework 18 is supported on I-beams 56, 57 mounted on columns 58, 59, 60, 61 and together with them constitutes a vertical frame for our combined apparatus. In order to support the framework 18 on the I-beams 56, 57 we have provided a plate 62 to which in a line concentric with the centers 54, 55 of the braider heads 11, 12 is welded a bearing 63 for a vertical shaft 64 which has an enlarged journal 65. At its lower end the shaft 64 is fitted to a collar 66 with a shoulder 67 supported on a thrust bearing 68. An expansion 69 of the vertical, cylindrical, supporting shaft 64 supports a bushing 71 locked by means of a key 72 to the shaft 64. A platform 73 is welded to the bushing 71 so that it rotates with the shaft 64 which is driven by means of a sprocket 74, chain 76, sprocket 77, shaft 78, bevel gears 79 and 80, shaft 81, sprocket 82, chain 83, sprocket 84, and motor 13. Any slack in the chain 76 is taken up by an idler 86 mounted on a plate 87 which also supports the thrust bearing 68. The platform 73 is comprised of a channel 88 welded to another channel 89 at right angles. Flanges 91, 92 of the channel 88 are cut along lines 93, 94 and ends 96, 97 are bent up to form equal acute angles α with the plane of rotation of the platform 73. Rivet plates 98 fastened to the flanges 91, 92 by means of rivets 99 lock the ends 96, 97 in their tilted positions. Holes 101, 102 in the ends 96, 97 of the channel 88 provide room for thrust bearings 103, 104 into which are fitted shafts 106, 107 supporting brackets 108, 109. The brackets 108, 109 hold reels 111, 112 of insulated conductors 113, 114 which pass upwardly through the plate 62 and are brought together at a forming die 116 fitted in a die holder 117 rigidly mounted on the plate 62 by means of a frame 115. At the die 116 the conductors are twisted together to form a twisted pair 118. The journal 65 of the shaft 64 is provided with eyelets 119, 120 for the passage of the conductors 113, 114. Our apparatus is particularly adapted to the manufacture of high temperature cables having insulation selected for its ability to withstand high temperatures rather than for other qualities with the result that the insulated conductors 113, 114 are not able to withstand excessive abrasion or flexing over sharp bends. This is particularly true where the insulated conductors 113, 114 are covered with glass-fiber braids which are notoriously poor in abrasion resistance. In FIGURE 2 the strands 113, 114 are being paid off from positions on the reels 111, 112 closest to the shaft 64 but when the brackets 108, 109 have rotated 180° on the shafts 106, 107, as will be hereinafter described, the strands will be in the positions shown by the dashed lines 113a, 114a. To minimize the angle formed by these wires the angles α are so chosen that the center lines of the shafts 106, 107 pass through the entrance to the die 116. The shafts 106, 107 are fitted with toothed pulleys 121, 122 which are connected by means of flat timing belts 123, 124 to stationary toothed pulleys 126, 127 mounted on a fixed bracket 125 within which the expansion 69 of shaft 64 is free to rotate. The pulley 121 has the same diameter as the pulley 126 and the pulley 122 has the same diameter as the pulley 127 with the result that each rotation of the platform 73 will produce one rotation of each of the shafts 106, 107 causing planetary motion in the reels 108, 109. Since the shafts 106, 107 are tilted from the vertical, two pairs of rollers 128, 129 prevent the belts 123, 124 from slipping from the pulleys. Persons skilled in the art of cable stranding will recognize that the present method of imparting planetary motion is an improvement by way of simplicity and economy over the conventional methods of employing planetary gearing. Absent the planetary rotation of the reels 11, 112 and the conductors 113, 114 would each be twisted around its own axis for every revolution of the platform 73. Whereas this might be tolerable for some types of cables it cannot be allowed when the insulated conductors are covered with glass-fiber braids and particularly where said braids are closely applied. Glass-fiber is known to have very low elongation and the braided wire cannot withstand a torsional deformation without buckling and even breaking the individual strands.

Above the die 116 there is mounted an extrusion die 131 connected by means of a pressure hose 132 to an extrusion pump 133 driven by a motor 134. The pump 133 forces a filling compound into an opening 136 in the die 131 to thoroughly cover the twisted pair 118.

On the channel 89 of the platform 73 are fixedly mounted brackets 137, 138 holding coils of filler material wound on reels 139, 140. Filler material strands 141, 142 are paid from the coils on the reels 139, 140 through eyelets 143, 144 in the journal 65 and enter the die 116 to occupy the valleys between the conductors 113, 114. It is a feature of our invention that the extrusion die 131 is close to the die 116 so that any inequality of the lengths of the conductors 113, 114 will push harmlessly backward through the forming die 116 and not form a loop due to the pressure in the extrusion die 131. We prefer that the distance between the die 116 and the extrusion die 131 shall not exceed one lay-length of the twist imparted to the pair by reason of the rotation of the platform 73. The reel 111 is mounted in the bracket 108 by means of a shaft 145 (FIGURE 1) which rotates in bearings 146, 147 (FIGURE 1). The shaft 145 is locked to the reel 111 by means of a collar 148 and pin 149. A friction pulley 151 is keyed to the shaft 145 so that tightening of a belt 152 can apply tension to the conductor 113. An identical arrangement on the reel 112 applies tension to the conductor 114.

*Operation*

In the operation of our apparatus reels 111, 112 wound with silicone insulated, glass-braided conductors are mounted respectively in the brackets 108, 109 and threaded through the eyelets 119, 120, die 116 and extrusion die 131. Similarly, reels holding coils of filler material such as saturated asbestos roving are placed on the brackets 137, 138 and threaded through the eyelets 143, 144, die 116 and extrusion die 131. A lead strand is tied to the conductors 113, 114, and fillers 141, 142 above the extrusion die 131 and threaded through the braiding heads 12 and 11, and several turns are taken around the capstand 19 whence it passes to a take-up reel, not shown. Compound is placed in the extruder 133 and the motor 134 is started so that compound is urged through the hose 132 to the extrusion die 131. When compound reaches the extrusion die 131, the motor 13 is energized turning the capstan 19, braider heads 11 and 12 and platform 73. The braider head 12 applies a copper wire braid over the twisted pair 118 in a known manner except that the tension is adjusted high enough to cause the braid to embed itself in the compound extruded over the pair. Methods of adjusting the tension on Wardwell Braiding Machines are well known and do not constitute an inventive feature of the instant invention. The braider head 11 applies a colored glass identifying braid over the copper braid and this braid, also, is applied under high tension so that it is embedded in the compound that has oozed through the copper braid.

We have invented a new and useful apparatus for which we desire an award of Letters Patent.

We claim:

1. Apparatus for twisting and braiding a fluid-tight cable comprising at least one braider head, means for advancing a pair of insulated conductors and a pair of filler strands through said head, a rotating platform mounted beneath said head, a pair of diametric insulated-conductor supply reels mounted on said platform, means for imparting planetary motion to said reels, a pair of diametric filler-strand supply coils mounted on said platform, a forming die mounted centrally on said apparatus beneath said head, and an extrusion head coaxial with said die between said die and said braiding head.

2. Apparatus for twisting and braiding a fluid-tight cable comprising a vertical frame, at least one braider head mounted on said frame, means mounted at the top of said frame for advancing a plurality of filaments and a like plurality of filler strands through said head, a rotating platform mounted on said frame beneath said head, a plurality of filament supply reels mounted on said platform, means mounted on said frame for imparting planetary motion to said reels, a like plurality of filler-strand supply coils mounted on said platform, a forming die mounted centrally on said frame beneath said head, and an extrusion head coaxial with said die mounted on said frame between said die and said braiding head.

3. Apparatus for twisting and braiding a fluid-tight cable comprising a vertical frame, at least one braider head mounted on said frame, means mounted at the top of said frame for advancing a plurality of insulated conductors and a like plurality of filler strands through said head, a rotating platform mounted on said frame beneath said head, a plurality of brackets mounted on said platform holding a like plurality of supply reels, means mounted on said frame for imparting planetary motion to said reels, a like plurality of filler-strand supply coils mounted on said platform, a forming die mounted centrally on said frame beneath said head, said brackets being tilted toward said forming die whereby said planetary motion of each of said reels occurs in a plane normal to a line joining said die to the midpoint of said reel, and an extrusion head coaxial with said die mounted on said frame between said die and said braiding head.

4. Apparatus for twisting and braiding a fluid-tight cable comprising a vertical frame, at least one braider head mounted on said frame, means mounted at the top of said frame for advancing a plurality of insulated conductors and a like plurality of filler strands through said head, a rotating platform mounted on said frame beneath said head, a plurality of bearings mounted on said platform, a plurality of shafts mounted in said bearings and supporting a like plurality of brackets, a plurality of insulated conductor supply reels mounted in said brackets, drive pulleys mounted on said shafts, stationary pulleys mounted centrally of said frame, belts connecting each of said drive pulleys with one of said stationary pulleys thereby imparting planetary motion to said reels, a plurality of filler-strand supply coils mounted on said platform, a forming die mounted centrally on said frame beneath said head, and an extrusion head coaxial with said die mounted on said frame between said die and said braiding head.

5. Apparatus for twisting and braiding a fluid-tight cable comprising a vertical frame, at least one braider head mounted on said frame, means mounted at the top of said frame for advancing a plurality of insulated conductors and a like plurality of filler strands through said head, a rotating platform mounted on said frame beneath said head, a plurality of bearings mounted on said platform, a plurality of shafts mounted in said bearings and supporting a like plurality of brackets, a plurality of insulated-conductor supply reels mounted in said brackets, a forming die mounted centrally on said frame beneath said head, said shafts and said brackets being tilted toward said forming die whereby said planetary motion of each of said reels occurs in a plane normal to a line joining said die to the midpoint of said reel, drive pulleys mounted on said shafts, said pulleys being tilted at an acute angle to the plane of rotation of said platform, stationary pulleys mounted centrally of said frame, belts connecting each of said drive pulleys with one of said stationary pulleys, thereby imparting planetary motion to said reels, a plurality of braces extending downwardly from said platform, a like plurality of rollers mounted on said braces, said rollers deflecting said belts so as to compensate for the tilt of said drive pulleys, a plurality of filler-strand supply coils mounted on said platform, and an extrusion head coaxial with said die mounted on said frame between said die and said braiding head.

6. The method of making a fluid-tight cable comprising the steps of twisting a pair of insulated, braided conductors around a vertical axis without twisting said conductors around their own axes, passing said conductors directly into a forming die along with strands of filler material filling the valleys between said conductors to form a filled, twisted pair, passing said pair directly and vertically through an extrusion head, said head applying an excess of pasty compound over said twisted pair, thence passing the paste-covered pair directly and vertically through a braiding head applying a copper braid over said pair, said braid being imbedded in said compound and an excess of said compound extruding through said braid, and thence passing said braided pair directly and vertically through a second braiding head applying a glass braid over said pair, said glass braid being imbedded in said compound and having its interstices sealed by said compound.

References Cited in the file of this patent

UNITED STATES PATENTS

| | | |
|---|---|---|
| 1,727,096 | Bourn | Sept. 3, 1929 |
| 1,780,722 | Schneider et al. | Nov. 4, 1930 |
| 2,048,893 | Rogers | July 28, 1936 |
| 2,345,864 | Arnold | Apr. 4, 1944 |
| 2,427,507 | Powell et al. | Sept. 16, 1947 |